(12) United States Patent
Tsuji (10) Patent No.: US 10,776,641 B2
(45) Date of Patent: Sep. 15, 2020

(54) INFORMATION PROCESSING DEVICE AND METHOD OF DETERMINING AN IMAGE DATA DISPLAYED ON THE SAME

(71) Applicants: NISSAN MOTOR CO., LTD., Kanagawa (JP); RENAULT S.A.S., Boulogne-Billancourt (FR)

(72) Inventor: Masafumi Tsuji, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 76 days.

(21) Appl. No.: 16/095,298

(22) PCT Filed: Apr. 20, 2016

(86) PCT No.: PCT/JP2016/062489
§ 371 (c)(1),
(2) Date: Oct. 19, 2018

(87) PCT Pub. No.: WO2017/183128
PCT Pub. Date: Oct. 26, 2017

(65) Prior Publication Data
US 2019/0095732 A1    Mar. 28, 2019

(51) Int. Cl.
*G06K 9/00*        (2006.01)
*B60K 37/02*       (2006.01)
(Continued)

(52) U.S. Cl.
CPC .......... *G06K 9/00832* (2013.01); *B60K 35/00* (2013.01); *B60K 37/02* (2013.01); *B60R 11/02* (2013.01); *B60R 11/04* (2013.01); *G06K 9/00228* (2013.01); *G06T 7/70* (2017.01); *B60K 2370/15* (2019.05); *B60K 2370/70* (2019.05);
(Continued)

(58) Field of Classification Search
CPC .............................. G06K 9/00832; G06T 7/70
See application file for complete search history.

(56) References Cited

U.S. PATENT DOCUMENTS

2013/0261892 A1    10/2013    Inui
2014/0125583 A1*    5/2014    Aoki ...................... B60K 37/02
                                                       345/156
(Continued)

FOREIGN PATENT DOCUMENTS

JP    2008-146356 A    6/2008
JP    2012-104052 A    5/2012
(Continued)

*Primary Examiner* — Tuan H Nguyen
(74) *Attorney, Agent, or Firm* — Osha Liang LLP (57) ABSTRACT

An information processing device installed inside a vehicle includes a first input port inputting a first image data imaged by a first imaging device, a second input port inputting a second image data imaged by a second imaging device, a display displaying an image data, and a controller determining the image data displayed on the display in accordance with an installation location of the information processing device inside the vehicle. The controller estimates the installation location of the information processing device based on a position of a human being's face detected by the first image data and distance information to an object detected by the second image data.

12 Claims, 9 Drawing Sheets

(51) Int. Cl.
  *B60K 35/00* (2006.01)
  *B60R 11/02* (2006.01)
  *B60R 11/04* (2006.01)
  *G06T 7/70* (2017.01)

(52) U.S. Cl.
  CPC .................. *B60K 2370/736* (2019.05); *G06T 2207/30201* (2013.01)

(56) References Cited

U.S. PATENT DOCUMENTS

2015/0309569 A1* 10/2015 Kohlhoff ................ G06F 3/013
  345/156
2016/0224108 A1 8/2016 Kuehne et al.

FOREIGN PATENT DOCUMENTS

| | | |
|---|---|---|
| JP | 2012-214087 A | 11/2012 |
| JP | 2013-203170 A | 10/2013 |
| JP | 2014-094647 A | 5/2014 |
| WO | 2015/039746 A1 | 3/2015 |
| WO | 2015/164584 A1 | 10/2015 |

* cited by examiner

INFORMATION PROCESSING DEVICE AND METHOD OF DETERMINING AN IMAGE DATA DISPLAYED ON THE SAME

BACKGROUND

Technical Field

The present invention relates to an information processing device and a method of determining an image data displayed on a display of an information processing device.

Related Art

A vehicular display device is known which controls the display unit of a mobile terminal to display the contents (see Patent Document 1, for example). The mobile terminal is disposed at a predetermined location in a vehicle. In the vehicular display device described in Patent Document 1, a reference position in the vehicle and positions of the driver's eyes are recognized by an imaging unit of the mobile terminal, and at least one of the display size and display position of the contents is changed in accordance with the positions of the driver's eyes with respect to the reference position.
[Patent Document 1] JP2014-94647A

SUMMARY OF INVENTION

In the vehicular display device described in Patent Document 1, the above reference position is set with respect to a predetermined installation location of the mobile terminal in front of the driver. Thus, the vehicular display device cannot respond to a situation in which the mobile terminal is disposed at an arbitrary location in front of the driver.

An information processing device and a method of determining an image data displayed on a display of an information processing device with which the information in accordance with a location of the information processing device can be displayed even in a situation in which the information processing device having the display is disposed at an arbitrary location in front of the person.

One or more embodiments of the present invention includes determining an image data to be displayed on a display in accordance with an installation location of the information processing device estimated on based on a position of a face of a person detected by a first image data and distance information to an object detected by a second image data.

According to one or more embodiments of the present invention even in a situation in which the information processing device having a display is disposed at an arbitrary location in front of a person, information in accordance with the location of the information processing device can be controlled to display.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
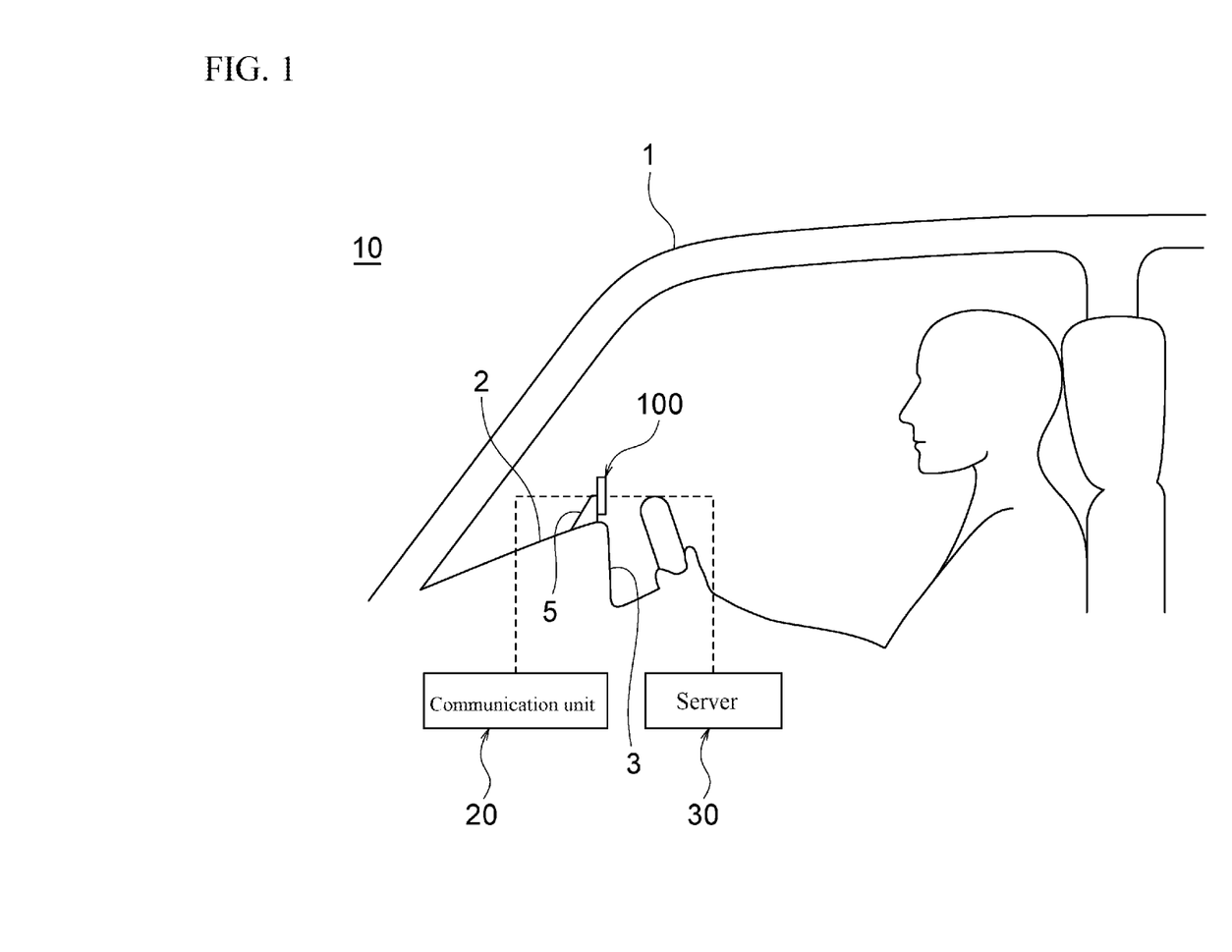
FIG. 1 is a diagram schematically illustrating a vehicular information display system according to one or more embodiments of the present invention.

FIG. 1 is a diagram schematically illustrating a vehicular information display system 10 according to one or more embodiments of the present invention. The vehicle information display system 10 illustrated in the figure is a system for displaying information on a display unit 101 (see FIG. 2) of a display device 100 in accordance with its installation location. The display device 100 is installed at an arbitrary location in front of the driver's seat in a vehicle 1. The vehicular information display system 10 comprises the display device 100, a communication unit 20, and a server 30. The display device 100 can be fixed by a fixing device 5 to a location on the dashboard 2 of the vehicle, in front of the meter panel 3, or the like.

Figure 2:
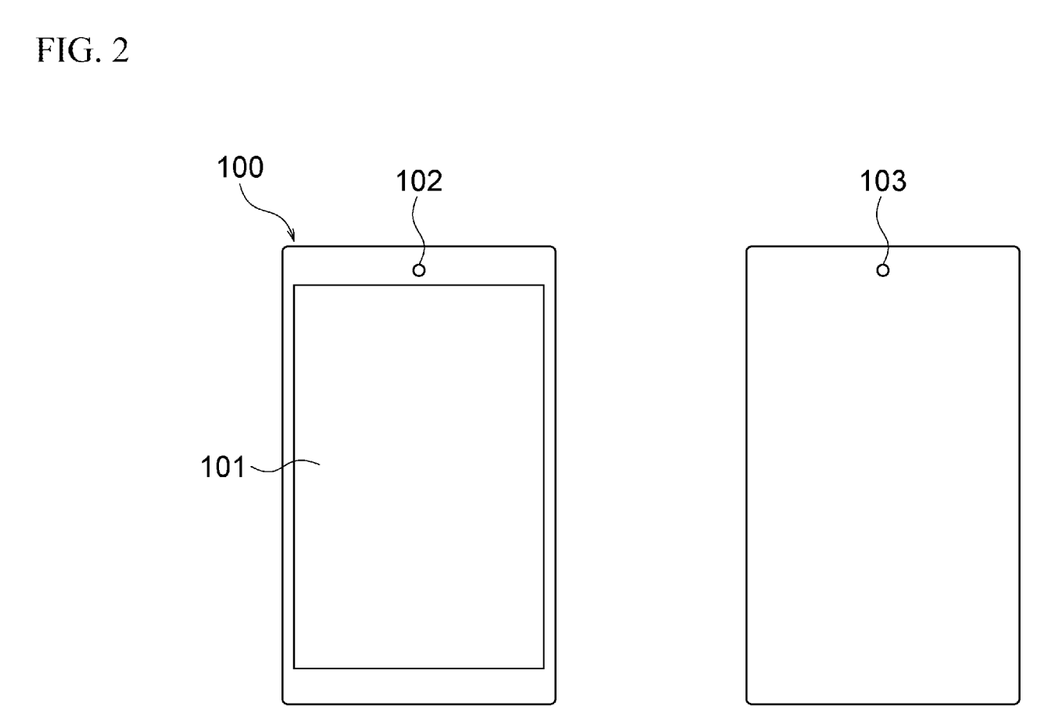
FIG. 2 is a set of views illustrating the front surface and back surface of a display device of FIG. 1.

FIG. 2 is a set of views illustrating the front surface and back surface of the display device 100. As illustrated in the figure, the display device 100 is a mobile terminal device comprising the display unit 101 and first and second imaging devices 102 and 103.

Examples of the display device 100 include mobile terminals such as a smartphone, a tablet terminal, and a PDA. In one or more embodiments of the present invention, the display device 100 is a smartphone, the display unit 101 is a display such as a liquid crystal display and an organic EL display, the first imaging device 102 is an in-camera, and the second imaging device 103 is an out-camera. The display device 100 is installed with application software for executing a process of displaying an image on the display unit 101 in accordance with the installation location. The image to be displayed on the display unit 101 in accordance with the installation location will be described later.

The communication unit 20, which is connected to an in-vehicle network such as a controller area network (CAN), receives vehicle information from on-board devices such as an engine control unit or electronic control unit (ECU)). Examples of the vehicle information include the speed, engine speed, brake state, steering state, captured images from on-board cameras, winker state, On/OFF of headlamp and width indicator switches, and ON/OFF of ignition switch. The communication unit 20, which is connected to the display device 100 via wireless communication such as Bluetooth (registered trademark) or wired communication such as wired LAN, transmits the vehicle identification information such as the vehicle identification number, the vehicle information received from the on-board devices, and other necessary information to the display device 100.

The server 30, which is connected to a wireless communication network, transmits information to the display device 100 and receives information from the display device 100. Examples of the wireless communication network include a communication network for mobile phones, such as long term evolution (LTE) and 3G, a wireless communication network such as WiMAX (registered trademark), and a wireless communication network for an intelligent transportation system, such as beacon. In one or more embodiments of the present invention, the server 30 acquires the vehicle identification information, the vehicle information, and the information on the display device 100 from the display device 100 and transmits information necessary for information display processing (referred to as "display processing information," hereinafter) to the display device 100. Allocation of processing and functions between the server 30 and the display device 100 may be appropriately set. For example, the server 30 and the display device 100 may be configured to cooperate with each other so that the server 30 creates the information to be displayed on the display unit 101 of the display device 100 on the basis of the information acquired from the display device 100 and transmits the created information to the display device 100.

Figure 3:
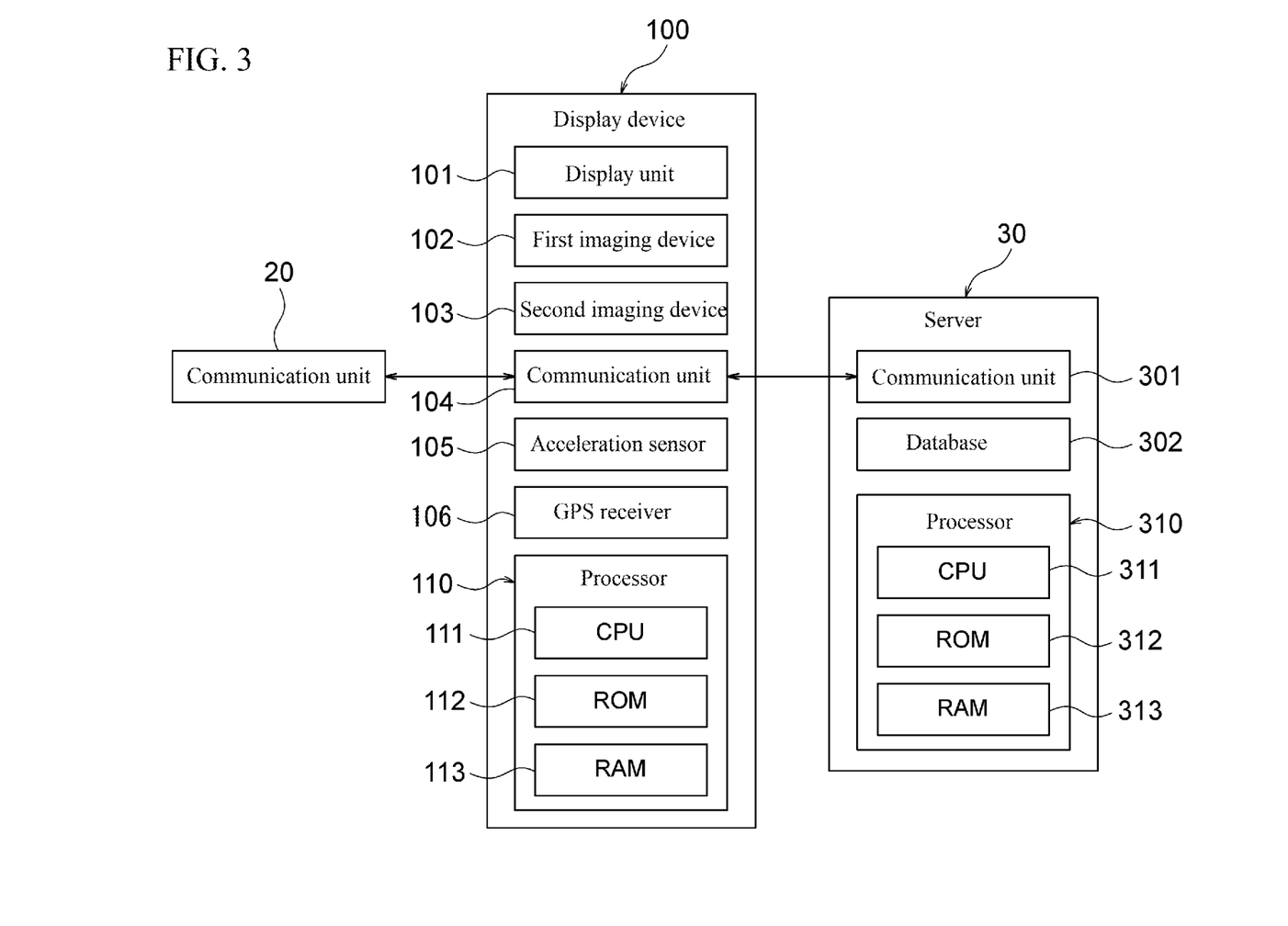
FIG. 3 is a block diagram illustrating the vehicular information display system of FIG. 1.

FIG. 3 is a block diagram illustrating a schematic configuration of the vehicular information display system 10. As illustrated in the figure, the display device 100 includes a communication unit 104, an acceleration sensor 105, a global positioning system (GPS) receiver 106, and a processor 110 in addition to the above-described display unit 101 and first and second imaging devices 102 and 103.

The communication unit 104, which receives the above-described vehicle identification information, vehicle information, and other necessary information from the communication unit 20, transmits these information items, GPS signals to be described later, and other necessary information to the server 30 and receives the display processing information, navigation information, and other necessary information from the server 30. The acceleration sensor 105, which is a micro electro mechanical system (MEMS) triaxial acceleration sensor or other appropriate sensor, can measure the acceleration in three directions of X-axis, Y-axis, and Z-axis and can also measure the gravity (static acceleration). The GPS receiver 106 receives the GPS signals related to the absolute position coordinates (latitude/longitude) of the display device 100 from GPS satellites.

The processor 110 is a computer comprising a ROM 112 that stores a display control program, a CPU 111 as an operation circuit that executes the display control program stored in the ROM 112, and a RAM 113 that serves as an accessible storage device.

The processor 110 has functions of executing an information acquisition process, an installation location estimation process, a display information creation process, and a display control process and executes each process by cooperation of software for implementing the process and the above-described hardware.

The server 30 comprises a communication unit 301, a database 302, and a processor 310. The communication unit 301 receives the vehicle identification information, the vehicle information, the GPS signals, and other necessary information from the communication unit 104 of the display device 100 and transmits the display processing information, the navigation information, and other necessary information to the communication unit 104 of the display device 100. The database 302 stores map information and the display processing information.

The processor 310 is a computer comprising a ROM 312 that stores a display control program, a CPU 311 as an operation circuit that executes the display control program stored in the ROM 312, and a RAM 113 that serves as an accessible storage device. The processor 310 has functions of executing an information acquisition process, a display processing information extraction process, and a navigation information creation process and executes each process by cooperation of software for implementing the process and the above-described hardware.

Figure 4:
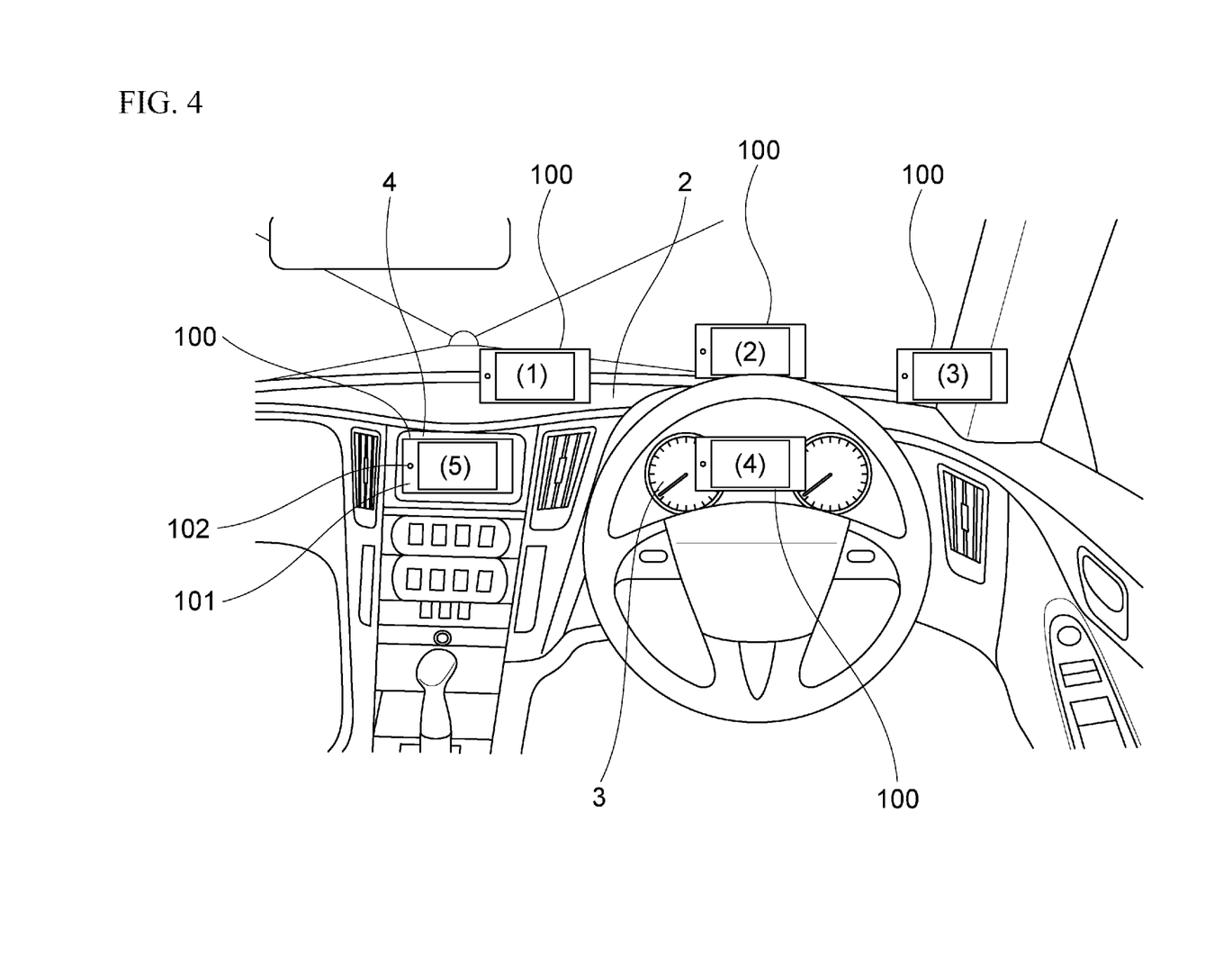
FIG. 4 is a view for describing an installation location estimation process executed by a processor of FIG. 3.
Figure 5:
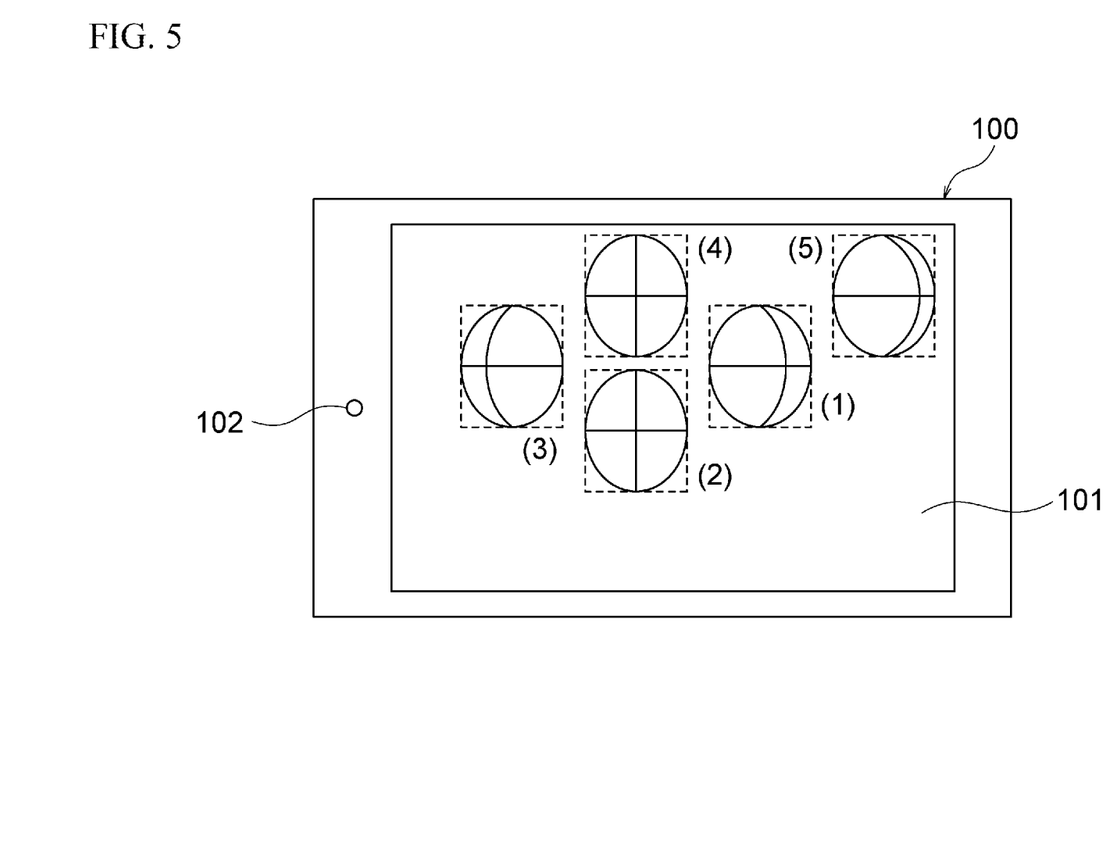
FIG. 5 is a view for describing the installation location estimation process executed by the processor of FIG. 3.

FIGS. 4 and 5 are views for describing the installation location estimation process executed by the processor 110. As illustrated in FIG. 4, when the display device 100 is installed on the dashboard 2 in front of the driver or installed in front of the meter panel 3 or a center console 4, the driver's face falls within the field angle of the first imaging device 102, which is an in-camera, and the captured image thus includes the driver's face.

In the following description, the installation location on the dashboard 2 around its center (on the left side as viewed from the driver) in the right-hand drive vehicle will be referred to as an installation location (1), the installation location on the dashboard 2 just in front of the driver will be referred to as an installation location (2), and the installation location on the dashboard 2 on the right side as viewed from the driver will be referred to as an installation location (3). Likewise, the installation location facing the driver in front of the meter panel 3 will be referred to as an installation location (4), and the installation location in front of the center console 4 will be referred to as an installation location (5). It is usual for the driver to adjust the display unit 101 of the display device 100 so that the driver can easily see the display unit 101, but the description of the relationship between the installation location of the display device 100 and the position of the driver's face in the image captured by the first imaging device 102 will be made on the assumption that the display unit 101 of the display device 100 is disposed perpendicularly to the vehicle longitudinal direction. It is also assumed that the display device 100 in a rectangular shape is installed sideways. Further, it is assumed that the first imaging device 102 is located on the left side of the display unit 101.

FIG. 5 is a view illustrating positions at which the driver's face is displayed and directions of the driver's face when the image captured by the first imaging device 102 is displayed on the display unit 101 of the display device 100 installed at the installation locations (1) to (5). As illustrated in the figure, the image captured by the first imaging device 102, which is an in-camera, is displayed as a mirror image on the display unit 101.

When the display device 100 is installed at the installation location (5) on the lower left as viewed from the driver, the driver's face is displayed at the upper right of the display unit 101. When the display device 100 is installed at the installation location (2) on the front upper side as viewed from the driver, the display position of the driver's face on the display unit 101 is reversed upside down as compared with when the display device 100 is installed at the installation location (4) on the front lower side as viewed from the driver. When the display device 100 is installed at the installation location (4), the driver's face is displayed on the upper part slightly to the left of the center of the display unit 101.

When the display device 100 is installed at the installation location (3) on the upper right as viewed from the driver, the display position of the driver's face on the display unit 101 is reversed from side to side as compared with when the display device 100 is installed at the installation location (1) on the upper left as viewed from the driver. When the display device 100 is installed at the installation location (1), the driver's face is displayed slightly to the right of the center of the display unit 101.

When the display device 100 is installed at the installation location (1) or (5) on the left side as viewed from the driver, the driver's face is displayed on the display unit 101 in a direction (rightward) in which the left face appears forward, while when the display device 100 is installed at the installation location (3) on the upper right as viewed from the driver, the driver's face is displayed on the display unit 101 in a direction (leftward) in which the right face appears forward. When the display device 100 is installed at the installation location (2) or (4) facing the driver, the driver's face is displayed on the display unit 101 in the front direction.

When the vehicular information display system 10 is applied to a left-hand drive vehicle, the installation location in front of the center console 4 is the lower right as viewed from the driver. Thus, when the display device 100 is arranged in front of the center console 4 of a left-hand drive vehicle, the driver's face is displayed leftward at the upper left of the display unit 101.

As described above, correlative relationships exist between the installation location of the display device 100 and the position and direction of the driver's face in the image captured by the first imaging device 102. The processor 110 therefore acquires the imaging information of the first imaging device 102 (ranging information at the time of AF control and captured images) in the information acquisition process, determines the position and direction of the driver's face in the image, which is captured by the first imaging device 102, in the installation location estimation process, and estimates the installation location of the display device 100 on the basis of the determination result.

As illustrated in FIG. 4, when the display device 100 is installed on the dashboard 2, the windshield or an object existing ahead of the windshield falls within the field angle of the second imaging device 103 as an out-camera and is ranged, and the luminance of the imaging range extending from the dashboard 2 to the front side of the vehicle is measured. When the display device 100 is installed in front of the meter panel 3, the meter panel 3 falls within the field angle of the second imaging device 103 and is ranged, and the luminance of the meter panel 3 is measured. When the display device 100 is installed in front of the center console 4, the center console 4 falls within the field angle of the second imaging device 103 and is ranged, and the luminance of the center console 4 is measured.

The distance to the object when the display device 100 is installed on the dashboard 2 is longer than that when the display device 100 is installed in front of the meter panel 3 or in front of the center console 4. The amount of change in the luminance of the imaging range when the display device 100 is installed on the dashboard 2 is larger than that when the display device 100 is installed in front of the meter panel 3 or in front of the center console 4.

As described above, correlative relationships exist between the installation location of the display device 100, and the distance to an object as the imaging information of the second imaging device 103 and the amount of change in the luminance of the imaging range. The processor 110 therefore acquires the imaging information of the second imaging device 103 (ranging information at the time of AF control and luminance) in the information acquisition process, determines the distance to an object and the amount of change in the luminance of the imaging range in the installation location estimation process, and estimates the installation location of the display device 100 on the basis of the determination result.

Figure 6:
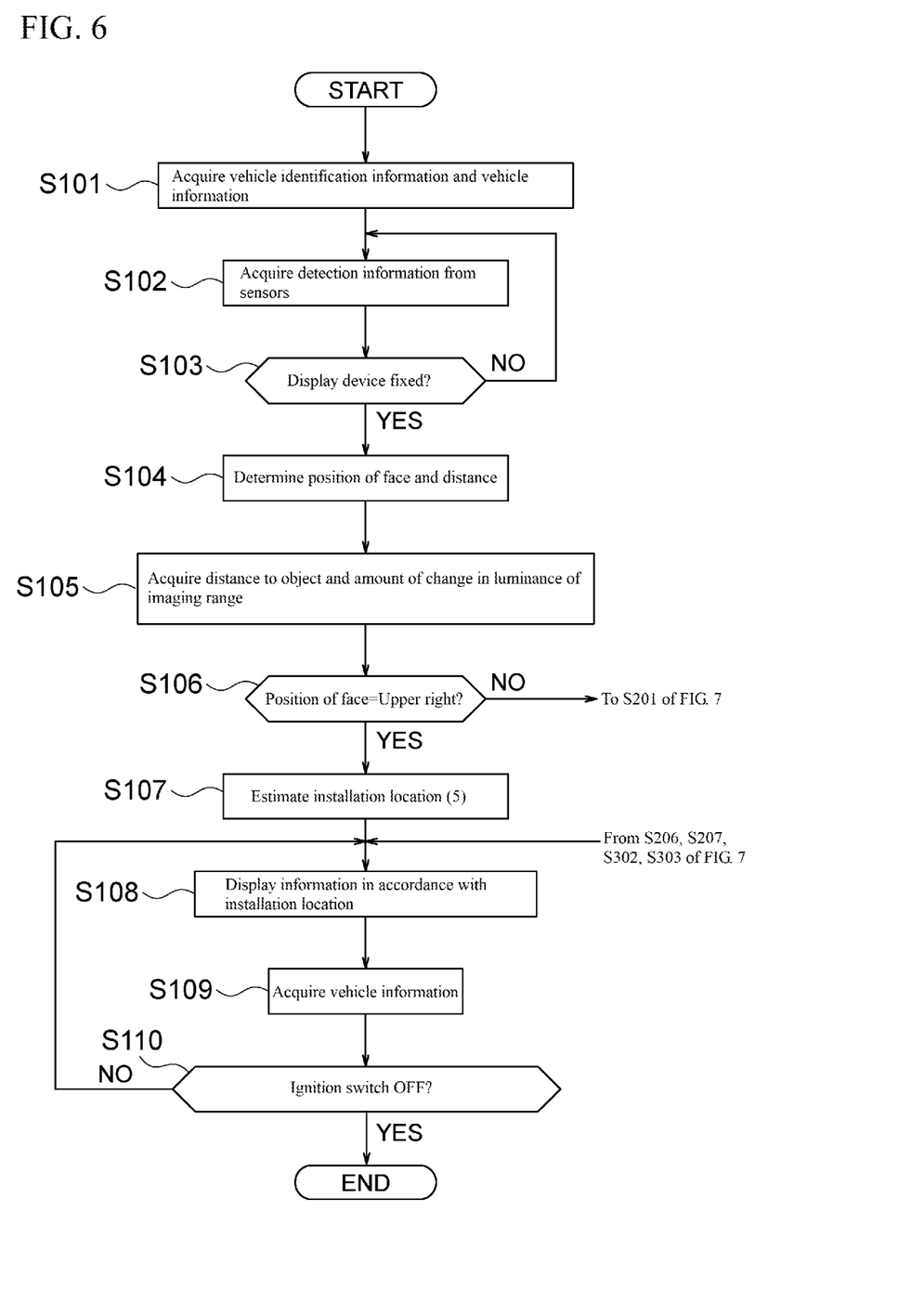
FIG. 6 is a flowchart illustrating the control procedure of an information display process executed by the vehicular information display system according to one or more embodiments of the present invention.
Figure 7:
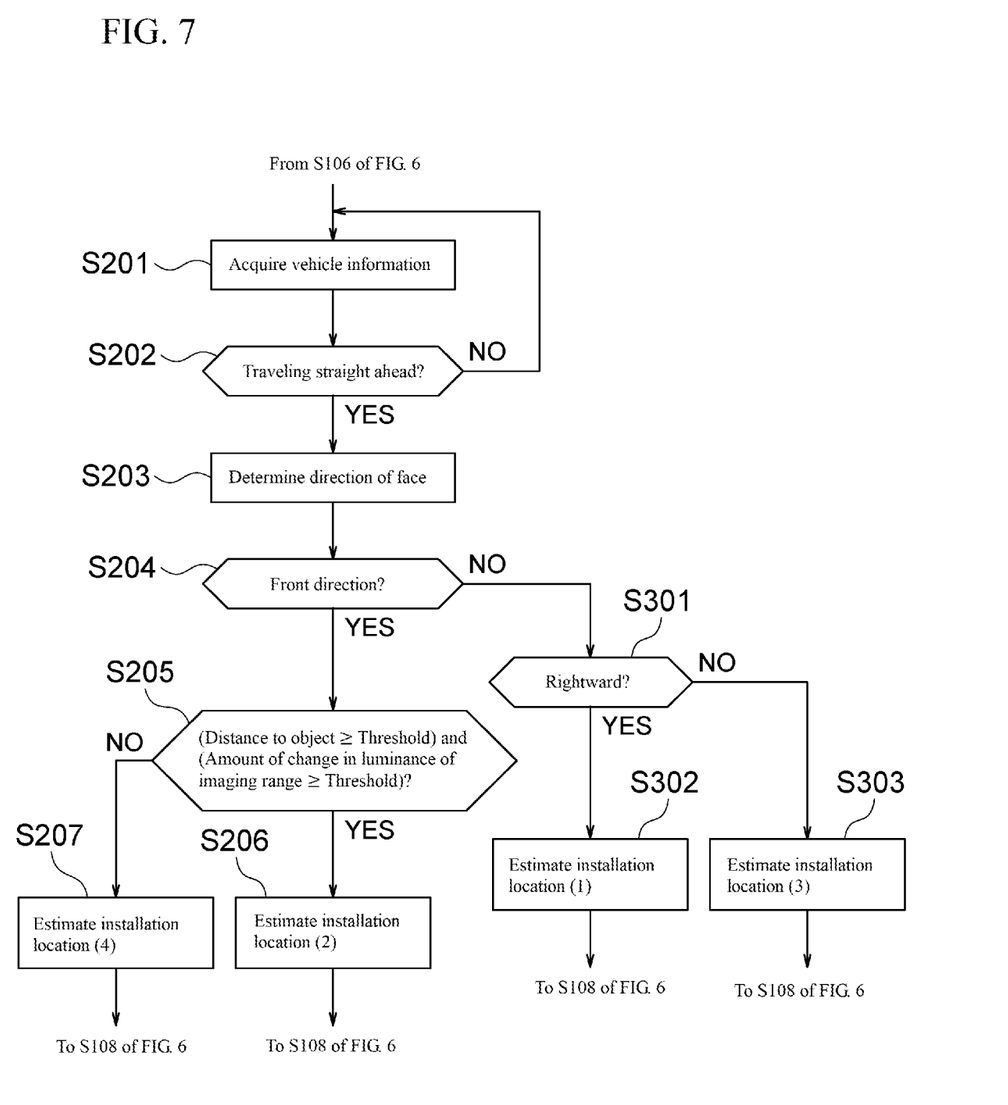
FIG. 7 is a flowchart illustrating the control procedure of the information display process executed by the vehicular information display system according to one or more embodiments of the present invention.

FIGS. 6 and 7 are flowcharts illustrating the control procedure of an information display process executed by the vehicular information display system 10 according to one or more embodiments of the present invention. The processing routine illustrated in the flowcharts of these figures is started when the application software installed in the display device 100 is activated.

First, the processor 110 of the display device 100 acquires the vehicle identification information and the vehicle information from the communication unit 20 of the vehicle 1 (step S101). The vehicle identification information acquired in this step includes information on the destination, which allows the processor 110 to identify whether the vehicle 1 is a left-hand drive vehicle or a right-hand drive vehicle and the equipment of the vehicle 1. The vehicle information acquired in this step includes at least the state of steering, the captured images from the on-board cameras, and ON/OFF of the ignition switch.

Subsequently, the processor 110 acquires detection information of the sensors equipped in the display device 100 (step S102). The detection information of the sensors acquired in this step includes the acceleration information detected by the acceleration sensor 105.

Subsequently, the processor 110 determines whether or not the display device 100 is in a fixed state on the basis of the acceleration information acquired in step S102 (step S103). In this step, the processor 110 determines whether or not the acceleration in the direction of gravity (Z-axis direction) detected by the acceleration sensor 105 is equal to or less than a predetermined threshold. When a negative determination is made in this step, the routine returns to step S102, while an affirmative determination in this step is followed by step S104.

In step S104, the processor 110 acquires the imaging information from the first imaging device 102 and analyzes the acquired imaging information thereby to determine the position of the driver's face in the captured image and the distance to the driver's face as an object. Then, the processor 110 acquires the imaging information, which includes the ranging information and the luminance information, from the second imaging device 103 and calculates the distance to the object and the amount of change in the luminance of the imaging range (step S105).

Subsequently, the processor 110 determines whether or not the driver's face is positioned at the upper right of the image captured by the first imaging device 102 (step S106). When an affirmative determination is made, the processor 110 estimates the installation location of the display device 100 as the installation location (5) (step S107). That is, the installation location (5), which is relatively far from the front of the driver, is estimated on the basis of the position of the driver's face in the image captured by the first imaging device 102. On the other hand, a negative determination in step S106 is followed by step S201 of FIG. 7. When the display device 100 is installed in front of the center console 4 of a left-hand drive vehicle, a determination is made as to whether or not the driver's face is positioned at the upper left of the image captured by the first imaging device 102. When an affirmative determination is made, the installation location of the display device 100 is estimated to be located in front of the center console 4.

Here, when the display device 100 is installed at any of the installation locations (1) to (4) closer to the driver as compared with the installation location (5), it is envisaged that the driver adjusts the direction of the display device 100 so that the driver can easily see the display unit 101. When the display device 100 is installed at any of the installation locations (1) to (4), therefore, no identifiable difference may occur in the position of the driver's face in the image captured by the first imaging device 102. Accordingly, only the installation location (5) is an installation location that is estimated on the basis of the position of the driver's face in the image captured by the first imaging device 102, and the installation locations (1) to (4) are estimated on the basis of the direction of the driver's face in the image captured by the first imaging device 102 and the ranging information and luminance information of the second imaging device 103.

In step S201, the processor 110 acquires the vehicle information from the communication unit 20. The vehicle information acquired in this step includes the vehicle speed and the steering angle. Then, the processor 110 determines whether or not the vehicle 1 is traveling straight ahead, on the basis of the vehicle speed and steering angle acquired in step S201 (step S202). An affirmative determination in this step is followed by step S203, while when a negative determination is made, the routine returns to step S201. In step S202, the processor 110 determines whether or not the vehicle speed is equal to or more than a predetermined threshold and the steering angle is equal to or less than a predetermined threshold. The threshold of vehicle speed as used herein is set to a value, such as 10 km/h, with which a determination can be made that the vehicle 1 is traveling. The threshold of steering angle is set to a value, such as 10°, with which a determination can be made that the vehicle 1 is traveling straight ahead.

In step S203, the processor 110 analyzes the image captured by the first imaging device 102 thereby to determine the direction of the driver's face in the image captured by the first imaging device 102. Then, the processor 110 determines whether or not the direction of the driver's face determined in step S203 is the front direction (step S204). An affirmative determination in this step is followed by step S205 while a negative determination in this step is followed by step S301.

In step S301, the processor 110 determines whether or not the direction of the driver's face determined in step S203 is rightward (the direction in which the left face appears forward). An affirmative determination in this step is followed by step S302 while a negative determination in this step is followed by step S303.

In step S302, the processor 110 estimates the installation location of the display device 100 as the installation location (1). On the other hand, in step S303, the processor 110 estimates the installation location of the display device 100 as the installation location (3). Then, steps S302 and S303 are followed by step S108 of FIG. 6.

That is, when the direction of the driver's face in the image captured by the first imaging device 102 is rightward, the processor 110 estimates the installation location of the display device 100 as the installation location (1). On the other hand, when the direction of the driver's face in the image captured by the first imaging device 102 is leftward (the direction in which the right face appears forward), the processor 110 estimates the installation location of the display device 100 as the installation location (3). Further, when the direction of the driver's face in the image captured by the first imaging device 102 is the front direction, the processor 110 estimates the installation location of the display device 100 as the installation location (2) or (4).

In step S205, the processor 110 estimates whether the installation location of the display device 100 is the installation location (2) or the installation location (4) on the basis of the ranging information and luminance information of the second imaging device 103. Specifically, the processor 110 determines whether or not the distance to an object is equal to or more than a predetermined threshold and the amount of change in the luminance of the image capturing range of the second imaging device 103 is equal to or more than a predetermined threshold. The threshold of the distance to an object as used herein is set to a value obtained by adding a short distance (e.g. 10 cm) to the distance between the meter panel 3 or the center console 4 and the display device 100 installed in front of it, that is, a value smaller than the distance between the windshield and the display device 100 on the dashboard 2. The threshold of the amount of change in the luminance of the image capturing range is set to a value obtained by adding a very small amount to the amount of change in the luminance of the meter panel 3 or the center console 4. This value is smaller than the amount of change in the luminance outside the vehicle. An affirmative determination in step 205 is followed by step S206 while a negative determination in step 205 is followed by step S207.

In step S206, the processor 110 estimates the installation location of the display device 100 as the installation location (2). On the other hand, in step S207, the processor 110 estimates the installation location of the display device 100 as the installation location (4). Then, steps S206 and S207 are followed by step S108 of FIG. 6.

That is, when the distance to an object of the second imaging device 103 is shorter than the distance to the windshield and the amount of change in the luminance of the imaging range is smaller than the amount of change in the luminance outside the vehicle, the processor 110 estimates the installation location of the display device 100 as the installation location (4). On the other hand, when the distance to an object of the second imaging device 103 is larger than the distance to the meter panel 3 or the center console 4 and the amount of change in the luminance of the imaging range is larger than the amount of change in the luminance of the meter panel 3 or the center console 4, the processor 110 estimates the installation location of the display device 100 as the installation location (2).

In step S108, the processor 110 controls the display unit 101 to display information in accordance with the installation location of the display device 100. When the installation location of the display device 100 is the installation location (1) at the upper left as viewed from the driver, notification information is displayed as to whether or not another vehicle or the like existing on the left side of the vehicle 1 is detected, for example, in the case of changing the route leftward, while navigation information (an image that substitutes for the function of on-board navigation) is displayed in other cases than the case of changing the route leftward. When the installation location of the display device 100 is the installation location (2) on the front upper side as viewed from the driver, an image captured ahead of the vehicle by the on-board camera is displayed, for example, in the case of passing through an intersection, while an image that substitutes for the function of the meter panel 3 is displayed in other cases than the case of passing through an intersection.

When the installation location of the display device 100 is the installation location (3) at the upper right as viewed from the driver, notification information is displayed as to whether or not another vehicle or the like existing on the right side of the vehicle 1 is detected, for example, in the case of changing the route rightward, while navigation information is displayed in other cases than the case of changing the route rightward. When the installation location of the display device 100 is the installation location (4) on the front lower side as viewed from the driver, an image that substitutes for the function of the meter panel 3, for example, is displayed. When the installation location of the display device 100 is the installation location (5) at the lower left as viewed from the driver, the navigation information, for example, is always displayed.

Subsequently, the processor 110 acquires the vehicle information (ON/OFF of the ignition switch) (step S109), and determines whether or not the ignition switch is OFF (step S110). When an affirmative determination is made in step S110, the processor 110 terminates the application software and terminates the process. On the other hand, when a negative determination is made in step S110, the routine returns to step S108 to continue the display of information on the display unit 101.

As described above, in the vehicular information display system 10 according to one or more embodiments of the present invention, the driver's face is imaged using the first imaging device 102 provided on the surface of the display device 100 on which the display unit 101 is provided, and the location of the display device 100 is estimated on the basis of the direction of the driver's face imaged by the first imaging device 102. This enables estimation of the location of the display device 100 which is disposed at an arbitrary location in front of the driver. Then, the display device 100 disposed at an arbitrary location in front of the driver can be controlled to display the information in accordance with its location.

As described above, a correlative relationship exists between the installation location of the display device 100 and the direction of the driver's face in the image captured by the first imaging device 10 when the vehicle 1 is traveling straight ahead. In the vehicular information display system 10 according to one or more embodiments of the present invention, therefore, the location of the display device 100 is estimated as a location on the left side as viewed from the driver (the installation location (1) or the installation location (5)) when the driver's face imaged by the first imaging device 102 is rightward while the vehicle 1 is traveling straight ahead, the location of the display device 100 is estimated as a location facing the driver (the installation location (2) or the installation location (4)) when the driver's face imaged by the first imaging device 102 is in the front direction while the vehicle 1 is traveling straight ahead, and the location of the display device 100 is estimated as a location on the right side as viewed from the driver (the installation location (3)) when the driver's face imaged by the first imaging device 102 is leftward while the vehicle 1 is traveling straight ahead. This enables accurate estimation of the location in the vehicle width direction of the display device 100 which is disposed at an arbitrary location in front of the driver.

As described above, a correlative relationship exists between the installation location of the display device 100 and the position of the driver's face in the image captured by the first imaging device 10. In the vehicular information display system 10 according to one or more embodiments of the present invention, therefore, the location of the display device 100 is estimated on the basis of the position of the driver's face in the image captured by the first imaging device 10. This enables estimation of the location of the display device 100 which is relatively far from the front of the driver, such as a location in front of the center console 4. Particularly in the vehicular information display system 10 according to one or more embodiments of the present invention, when the driver's face is positioned at the upper right of the image captured by the first imaging device 102, estimation is made that the display device 100 is located in front of the center console 4 of a right-hand drive vehicle. Through this operation, even when the driver has finely adjusted the direction of the display device 100 so that the driver can easily see the display unit 101, it is possible to specify the location of the display device 100 disposed in front of the center console 4 of a right-hand drive vehicle. When the driver's face is positioned at the upper left of the image captured by the first imaging device 102, estimation may be made that the display device 100 is located in front of the center console 4 of a left-hand drive vehicle.

As described above, a correlative relationship exists between the installation location of the display device 100 and the distance to an object located ahead of the vehicle. The distance is acquired by the second imaging device 103 which is provided on the back surface of the display device 100. In the vehicular information display system 10 according to one or more embodiments of the present invention, therefore, the process executed therein includes imaging a front side of the vehicle using the second imaging device 103, estimating that the location of the display device 100 is on the dashboard 2 (any of the installation locations (1) to (3)) when the distance to the object acquired by the second imaging device 103 is equal to or more than a predetermined distance, and estimating that the location of the display device 100 is in front of the front surface of the dashboard 2 (or the meter panel 3) (the installation location (4) or the installation location (5)) when the distance to the object acquired by the second imaging device 103 is less than the predetermined distance. This enables accurate estimation of the location in the vertical direction of the display device 100 which is disposed at an arbitrary location in front of the driver.

As described above, a correlative relationship exists between the installation location of the display device 100 and the amount of change in luminance of the imaging range of the second imaging device 103 which is provided on the back surface of the display device 100. In the vehicular information display system 10 according to one or more embodiments of the present invention, therefore, the process executed therein includes imaging a front side of the vehicle using the second imaging device 103, estimating that the location of the display device 100 is on the dashboard 2 (any of the installation locations (1) to (3)) when the amount of change in luminance of the imaging range acquired by the second imaging device 103 is equal to or more than a predetermined value, and estimating that the location of the display device 100 is in front of the front surface of the dashboard 2 (the installation location (4) or the installation location (5)) when the amount of change in luminance of the imaging range acquired by the second imaging device 103 is less than the predetermined value. This enables accurate estimation of the location in the vertical direction of the display device 100 which is disposed at an arbitrary location in front of the driver.

In the vehicular information display system 10 according to one or more embodiments of the present invention, the display unit 101 is controlled to display information in accordance with the estimated location of the display device 100. Through this operation, the display device 100 disposed at an arbitrary location in front of the driver can be controlled to display the information in accordance with the location.

Figure 8:
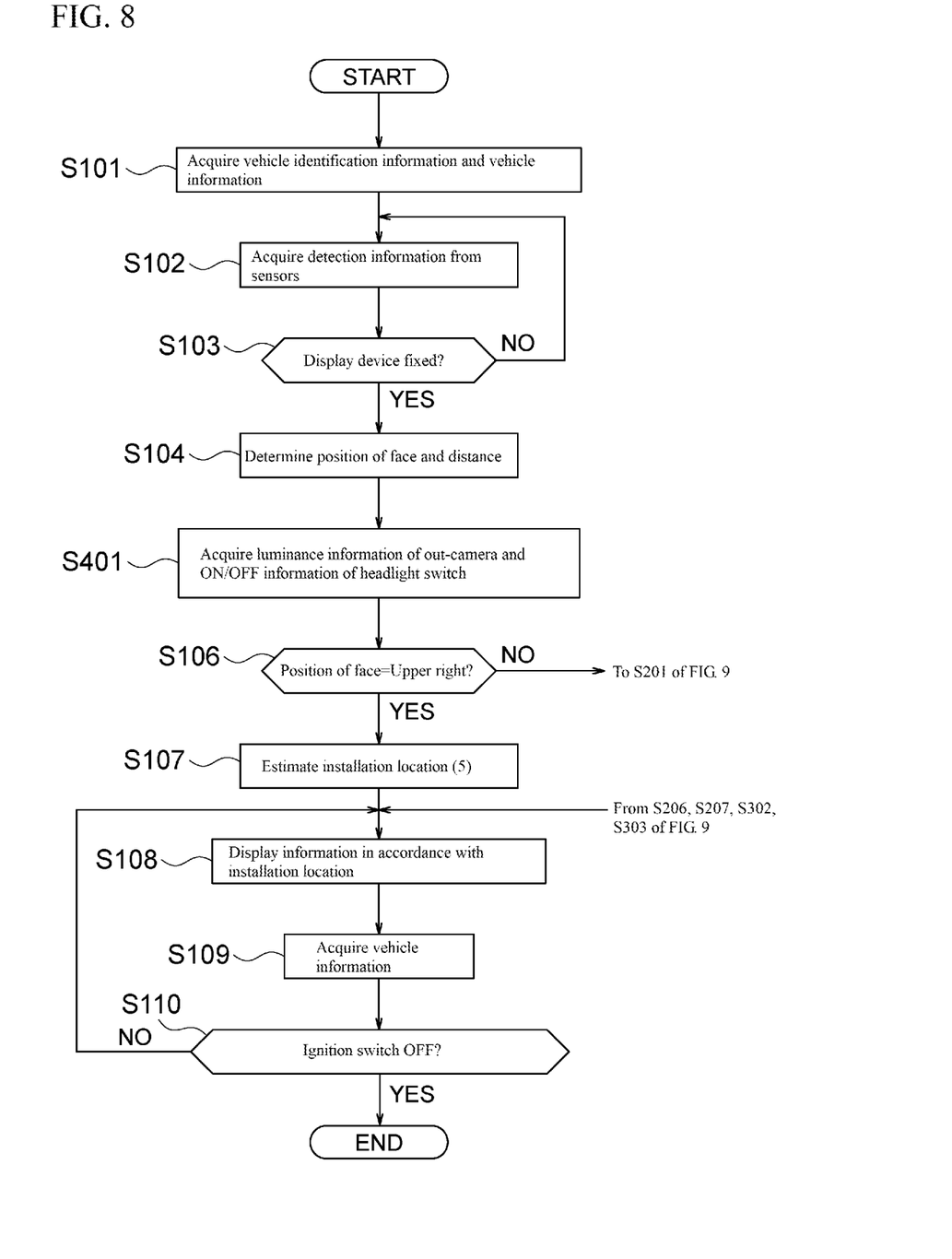
FIG. 8 is a flowchart illustrating the control procedure of an information display process executed by the vehicular information display system according to one or more embodiments of the present invention.
Figure 9:
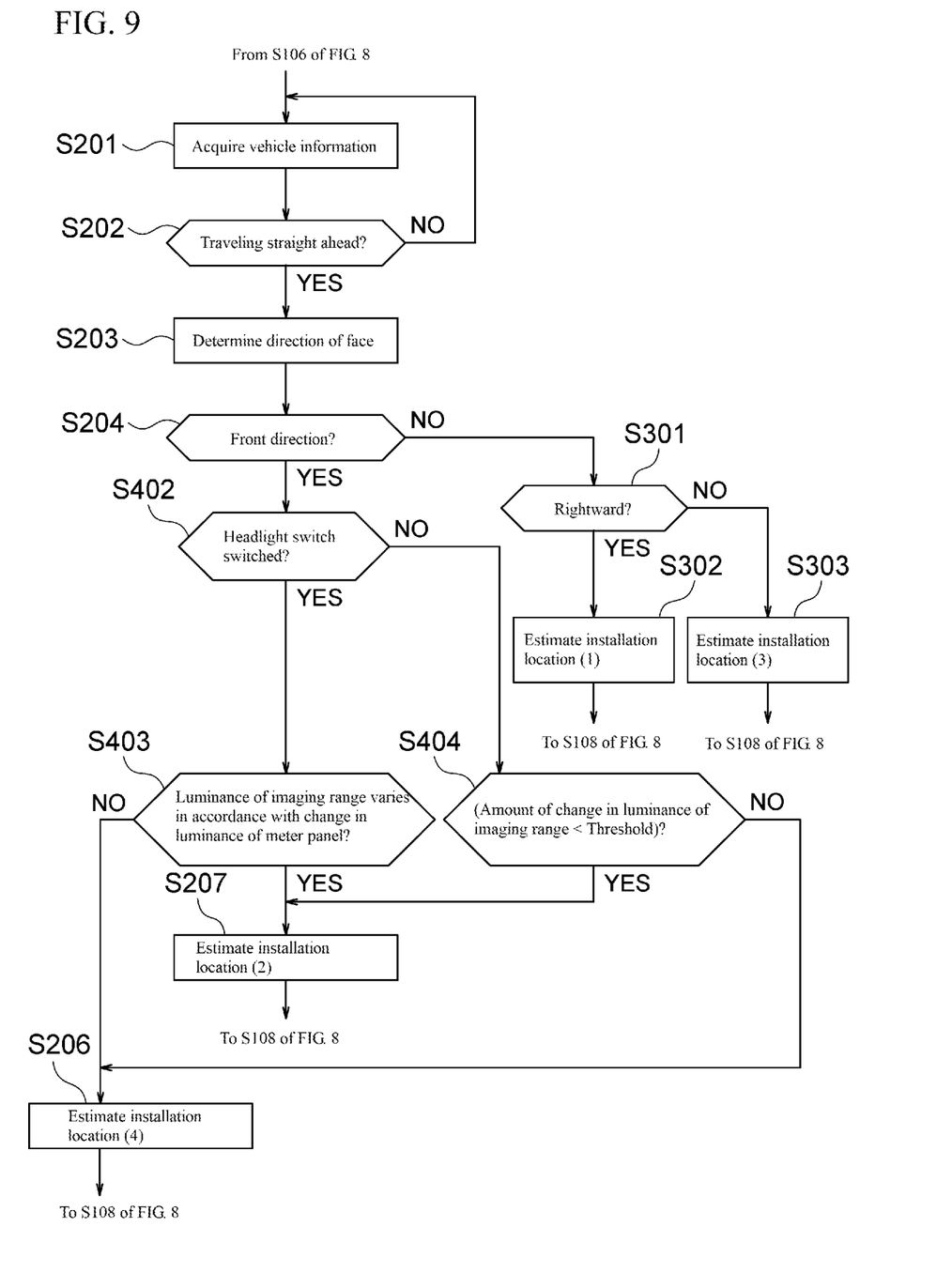
FIG. 9 is a flowchart illustrating the control procedure of the information display process executed by the vehicular information display system according to one or more embodiments of the present invention.

FIGS. 8 and 8 are flowcharts illustrating the control procedure of an information display process executed by the vehicular information display system 10 according to one or more embodiments of the present invention. Description of similar procedures as in the vehicular information display system 10 described above will be omitted and the above description will be borrowed herein.

After steps S101 to S104 are executed, the processor 110 acquires imaging information including luminance information from the second imaging device 103 and also acquires ON/OFF information of the headlight switch from the communication unit 20 (step S401). Here, control of the light amount of the backlight of the meter panel 3 and control of the display luminance are executed in cooperation with the ON/OFF switching of the headlamp switch or the width indicator switch; therefore, when the installation location of the display device 100 is the installation location (4), the luminance of the imaging range of the second imaging device 103 varies in cooperation with the ON/OFF switching of the headlamp switch or the width indicator switch.

That is, when the luminance of the imaging range of the second imaging device 103 varies even though the ON/OFF switching of the headlamp switch or the width indicator switch is not performed, the installation location of the display device 100 is the installation location (2) rather than the installation location (4). On the other hand, when the luminance of the imaging range of the second imaging device 103 does not vary while the ON/OFF switching of the headlamp switch or the width indicator switch is not performed, the installation location of the display device 100 is the installation location (4). Further, when the ON/OFF switching of the headlamp switch or the width indicator switch is performed and the luminance of the imaging range of the second imaging device 103 varies in accordance with the control of the light amount of the backlight of the meter panel 3 and/or the control of the display luminance, the installation location of the display device 100 is the installation location (4).

With consideration for the above, after steps S106 to S204 are executed, the processor 110 determines whether or not the luminance of the imaging range of the second imaging device 103 varies in cooperation with the ON/OFF switching of the headlamp switch (steps S402 to S404). Specifically, the processor 110 determines whether or not switching of the headlamp switch is performed (step S402), and when an affirmative determination is made, the processor 110 determines whether or not the luminance of the imaging range of the second imaging device 103 varies in accordance with the change in luminance of the meter panel 3. On the other hand, when a negative determination is made in step S402, the processor 110 determines whether or not the amount of change in the luminance of the imaging range of the second imaging device 103 is less than a predetermined threshold (step S404). In step S404, the threshold of the amount of change in the luminance is set to a value smaller than the amount of change in the luminance outside the vehicle.

An affirmative determination in step S403 is followed by step S207 while a negative determination in step S403 is followed by step S206. An affirmative determination in step S404 is followed by step S207 while a negative determination in step S404 is followed by step S206. In step S206, the processor 110 estimates the installation location of the display device 100 as the installation location (2). In step S207, the processor 110 estimates the installation location of the display device 100 as the installation location (4). Steps S206 and S207 are followed by step S108 of FIG. 8. Thereafter, steps S108 to S110 are executed.

As described above, in the vehicular information display system 10 according to one or more embodiments of the present invention, an object existing ahead of the vehicle is imaged using the second imaging device 103 provided on the surface opposite to the surface of the display device 100 on which the display unit 101 is provided, and when the luminance of the imaging range acquired by the second imaging device 103 varies in cooperation with a light amount selection switch (headlight switch or width indicator switch) of the meter panel 3, estimation is made that the location of the display device 100 is in front of the meter panel 3. Through this operation, even when the amount of change in the luminance is small in front of the dashboard 2, it is possible to identify whether the display device 100 is installed in front of the meter panel 3 or on the dashboard 2.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in one or more of the above-described embodiments, the location of the display device 100 disposed in front of the center console 4 (installation location (5)) is estimated on the basis of the position of the driver's face in the image captured by the first imaging device 102, but the present invention is not limited to this, and the installation location (5) may be estimated on the basis of the direction of the driver's face in the image captured by the first imaging device 102.

In one or more of the above-described embodiments, the location of the display device 100 disposed on the dashboard 2 (installation location (2)) and the location of the display device 100 disposed in front of the meter panel 3 (installation location (4)) are estimated on the basis of the ranging information and luminance information of the second imaging device 103, but the present invention is not limited to this, and they may be estimated on the basis of the position of the driver's face in the image captured by the first imaging device 102. In this case, the location of the display device 100 may be estimated on the basis of the upward or downward direction of the driver's face in the image captured by the first imaging device 102 (for example, the upward direction allows for estimation that the installation location of the display device 100 is the installation location (4)).

In one or more of the above-described embodiments, the location of the display device 100 disposed on the dashboard 2 (installation location (2)) and the location of the display device 100 disposed in front of the meter panel 3 (installation location (4)) are estimated on the basis of the ranging information and luminance information of the second imaging device 103, but the present invention is not limited to this, and they may be estimated on the basis of either the ranging information or the luminance information.

In one or more of the above-described embodiments, the information to be displayed on the display device 100 is set in accordance with the estimation result of the installation location of the display device 100, but the use application of the estimation result of the installation location of the display device 100 is not limited to this. For example, the estimation result of the installation location of the display device 100 may be used for other use application, such as an application in which a sound device of the display device 100 is turned on/off in accordance with the estimation result of the installation location of the display device 100.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

2 Dashboard
3 Meter panel
4 Center console
30 Server
310 Processor
100 Display device
101 Display unit
102 First imaging device
103 Second imaging device
110 Processor

The invention claimed is:

1. An information processing device installed inside a vehicle, comprising:
   a display displaying an image data;
   a first imaging device provided on a surface of the information processing device on which the display is provided;
   a second imaging device provided on a surface opposite to the surface of the information processing device on which the display is provided;
   a first input port inputting a first image data imaged by the first imaging device;
   a second input port inputting a second image data imaged by the second imaging device; and
   a controller determining the image data displayed on the display in accordance with an installation location of the information processing device inside the vehicle,
   wherein the controller estimates the installation location of the information processing device based on a position of a face of a person detected by the first image data and distance information to an object detected by the second image data.

2. The information processing device according to claim 1, wherein the image data displayed on the display is an image data of an object outside of the vehicle.

3. The information processing device according to claim 1, wherein the controller determines an image data captured ahead of the vehicle as the image data displayed on the display when the installation location of the information processing device is estimated at an upper side as viewed from the person.

4. The information processing device according to claim 1, wherein the controller determines navigation information or an image data of a meter panel as the image data displayed on the display when the installation location of the information processing device is estimated at a lower side as viewed from the person.

5. The information processing device according to claim 1,
   wherein the controller:
      estimates that the installation location of the information processing device is in front of a center console when the position of the face of the person imaged by the first imaging device is at upper right or upper left of a captured image;
      estimates that the installation location of the information processing device is on a dashboard when the position of the face of the person imaged by the first imaging device is not at upper right or upper left of the captured image and a distance to an object acquired by the second imaging device is equal to or more than a predetermined distance, the object being located ahead of the vehicle; and
      estimates that the installation location of the information processing device is in front of the dashboard when the position of the face of the person imaged by the first imaging device is not at upper right or upper left of the captured image and the distance to the object acquired by the second imaging device is less than the predetermined distance.

6. A method of determining an image data displayed on a display of an information processing device installed inside a vehicle, the method comprising:
   estimating an installation location of the information processing device based on a position of a face of a person detected by a first image data captured by a first imaging device of the information processing device and distance information to an object detected by a second image data captured by a second imaging device of the information processing device; and
   determining the image data displayed on the display in accordance with the installation location of the information processing device inside the vehicle,
   wherein the first imaging device is provided on a surface of the information processing device on which the display is provided, and the second imaging device is provided on a surface opposite to the surface of the information processing device on which the display is provided.

7. The method according to claim 6, wherein the image data displayed on the display is an image data of an object existed outside of the vehicle.

8. The method according to claim 6, wherein an image data captured ahead of the vehicle is determined as the image data displayed on the display when the installation location of the information processing device is estimated at an upper side as viewed from the person.

9. The method according to claim 6, wherein navigation information or an image data of a meter panel is determined as the image data displayed on the display when the installation location of the information processing device is estimated at a lower side as viewed from the person.

10. The method according to claim 6, further comprising:
    estimating that the installation location of the information processing device is in front of a center console when the position of the face of the person imaged by the first imaging device is at upper right or upper left of a captured image;
    estimating that the installation location of the information processing device is on a dashboard when the position of the face of the person imaged by the first imaging device is not at upper right or upper left of the captured image and a distance to an object acquired by the second imaging device is equal to or more than a predetermined distance, the object being located ahead of the vehicle; and
    estimating that the installation location of the information processing device is in front of the dashboard when the position of the face of the person imaged by the first imaging device is not at upper right or upper left of the captured image and the distance to the object acquired by the second imaging device is less than the predetermined distance.

11. The method according to claim 6, comprising:

imaging the face of the person using the first imaging device provided on a surface of the information processing device on which the display is provided;

estimating the location of the information processing device based on a direction of the face of the person imaged by the first imaging device;

imaging a front side of the vehicle using the second imaging device provided on a surface opposite to the surface of the information processing device on which the display is provided; and estimating that the location of the information processing device is in front of a meter panel when luminance of an imaging range acquired by the second imaging device varies in cooperation with a light amount selection switch of the meter panel.

12. The method according to claim 6, comprising:

estimating the location of the information processing device as a location on a left side as viewed from the person when the face of the person imaged by the first imaging device is rightward while the vehicle is traveling straight ahead;

estimating the location of the information processing device as a location facing the person when the face of the person imaged by the first imaging device is in a front direction while the vehicle is traveling straight ahead; and estimating the location of the information processing device as a location on a right side as viewed from the person when the face of the person imaged by the first imaging device is leftward while the vehicle is traveling straight ahead.

* * * * *